US006906127B2

United States Patent
Liang et al.

(10) Patent No.: US 6,906,127 B2
(45) Date of Patent: Jun. 14, 2005

(54) INTERCALATES, EXFOLIATES AND CONCENTRATES THEREOF FORMED WITH LOW MOLECULAR WEIGHT; NYLON INTERCALANTS POLYMERIZED IN-SITU VIA RING-OPENING POLYMERIZATION

(75) Inventors: Ying Liang, Lake Zurich, IL (US); Tie Lan, Lake Zurich, IL (US); Scott Omachinski, Mount Prospect, IL (US); Jae Whan Cho, Seosan Si (KR)

(73) Assignee: AMCOL International Corporation, Arlington Heights, IL (US)

( * ) Notice: Subject to any disclaimer, the term of this patent is extended or adjusted under 35 U.S.C. 154(b) by 253 days.

(21) Appl. No.: 10/214,672

(22) Filed: Aug. 8, 2002

(65) Prior Publication Data

US 2004/0030020 A1 Feb. 12, 2004

(51) Int. Cl.[7] .................................................. C08K 3/34
(52) U.S. Cl. ........................ 524/445; 524/446; 524/186
(58) Field of Search ................................. 524/445, 446, 524/447; 501/145, 148; 525/432, 190

(56) References Cited

U.S. PATENT DOCUMENTS

| 4,501,881 | A | * | 2/1985 | Greene et al. ............. 528/336 |
| 4,739,007 | A | | 4/1988 | Okada et al. |
| 5,102,948 | A | | 4/1992 | Deguchi et al. |
| 5,853,886 | A | | 12/1998 | Pinnavaia et al. |
| 5,877,248 | A | | 3/1999 | Beall et al. |
| 5,880,197 | A | | 3/1999 | Beall et al. |
| 5,994,445 | A | | 11/1999 | Kaschel et al. |
| 6,136,908 | A | * | 10/2000 | Liao et al. ................. 524/445 |

OTHER PUBLICATIONS

Usuki et al. J. Mat Res Vol. 8, No. 5, May 1993 pp. 1179–1183.*
Kirk–Othmer, Encyclopedia of Chemical Technology, Fourth Edition, vol. 19, Pigments to Powders, Handling; pp. 471–473 and 485–502 (1996).

* cited by examiner

Primary Examiner—Katarzyna Wyrozebski
(74) Attorney, Agent, or Firm—Marshall, Gerstein & Borun LLP (57) ABSTRACT

Nylon-intercalated (concentrate nylon), layered silicates, in concentrated form, containing at least 6% to about 40% by weight layered silicate, preferably about 8% to about 30% by weight layered silicate, intercalated with a nylon that is polymerized while in contact with the clay, during ring-opening polymerization of the nylon reactants (monomers) and melt processing. The in-situ nylon polymerization reaction to form the concentrate nylon is continued until the number average molecular weight (Mn) of the nylon is about 25,000 or less, preferably 15,000 or less, more preferably about 5,000–10,000, to maintain melt processability of the resulting concentrate.

20 Claims, 4 Drawing Sheets

INTERCALATES, EXFOLIATES AND CONCENTRATES THEREOF FORMED WITH LOW MOLECULAR WEIGHT; NYLON INTERCALANTS POLYMERIZED IN-SITU VIA RING-OPENING POLYMERIZATION

TECHNICAL FIELD

The compositions, methods and articles described herein are intercalates, exfoliates and nanocomposite concentrates thereof formed with low molecular weight nylon intercalants polymerized in-situ via ring-opening polymerization. More particularly, the present invention is directed to the manufacture of nylon-intercalated layered silicates, in concentrated form, containing at least 6% to about 40% by weight layered silicate, preferably about 8% to about 30% by weight layered silicate, intercalated with a nylon that is polymerized while in contact with the clay, during melt processing and ring-opening polymerization of the nylon reactants (monomers). The in-situ nylon polymerization reaction is continued until the number average molecular weight (Mn) of the nylon is about 25,000 or less, preferably less than 20,000, more preferably 15,000 or less, most preferably about 5,000–10,000, to maintain flowability of the resulting concentrate. The concentrates can be mixed into any desired matrix polymer to provide optimum dispersion and exfoliation of the nylon-intercalated layered silicate material to provide excellent barrier properties (low gas permeability) in the resulting nanocomposite, and, optionally, the nylon from the concentrate can be further polymerized to higher molecular weight in the nanocomposite.

BACKGROUND AND PRIOR ART

It is well known in the art to manufacture nanocomposites by polymerizing a polyamide monomer while in contact with a layered silicate material, e.g., a sodium smectite clay, that has been treated with a swelling agent, such as an onium ion, to form a nylon polymer-intercalated layered silicate dispersed in additional (non-intercalated) melted polymerized nylon (matrix polymer), e.g., see Toyota U.S. Pat. No. 4,739,007 (RE 37,385).

It is also well known in the nanocomposite art that nylon matrix polymers in nanocomposite compositions should have a number average molecular weight (Mn) that is relatively high, e.g., at least 20,000 in order to provide sufficiently high mechanical strengths (e.g., tensile strength and modulus of elasticity) and excellent thermal properties (e.g., high softening point and high temperature strengths, as well as other properties (e.g., see Toyota U.S. Pat. No. 4,739,007, Table 3).

Those skilled in the nanocomposite art have attempted to make a master batch or concentrate that includes a relatively high percentage of nylon-intercalated layered silicate material, e.g., 10% by weight or more layered silicate material, dispersed within a matrix polymer, without success. A primary difficulty in the melt-compounding manufacture of a nylon nanocomposite concentrate is that swelling agent-treated layered silicate materials have excellent compatibility with nylons, leaving little non-intercalated, melted nylon to enable sufficient flow (pumpability) of the composite material out of the compounder. Such concentrates frequently are in a relatively dry chunk or cake form, that adheres to reactor walls and compounder surfaces, having the nylon-intercalated clay unevenly dispersed within the little remaining excess, non-intercalated, nylon matrix polymer. Examples of required low percentages of layered silicate materials used in nylon-intercalated nanocomposite compositions are found in the Toyota U.S. Pat. No. 4,739,007 (5%) and Wolf Walsrode U.S. Pat. No. 5,994,445 (2%).

DEFINITIONS

Whenever used in this specification, the terms set forth shall have the following meanings:

"Layered Silicate Material" shall mean an inorganic material, such as a smectite clay mineral, that is in the form of a plurality of adjacent, bound layers and has a thickness, for each layer, of about 3 Å to about 50 Å, preferably about 10 Å.

"Platelets" shall mean individual layers of the Layered Silicate Material.

"Intercalate" or "Intercalated" shall mean a Layered Silicate Material that includes a polyamide polymer, polymerized in-situ, disposed between adjacent platelets of the Layered Silicate Material to increase the interlayer spacing between the adjacent platelets to at least about 10 Å, preferably at least about 20 Å.

"Intercalation" shall mean a process for forming an Intercalate.

"Optional Coupling Agent-Treated" or "Optional Coupling Agent-Treatment" or "Optional Coupling Agent-Reacted" shall mean the optional contact of a Layered Silicate Material with a coupling agent, e.g., a silane coupling agent, a titanate coupling agent, a zirconate coupling agent and/or an aluminate coupling agent to produce a condensation reaction between the coupling agent and —OH radicals at the edges of the platelets of the Layered Silicate Material.

"Intercalant Monomer" or "Intercalant" or "Polyamide Monomer" shall mean a monomeric organic compound that is capable of reacting and/or polymerizing to form a polyamide polymer that is mixed with the Layered Silicate Material at a temperature sufficient for polymerization (melt compounded), so that a portion thereof is sorbed between Platelets of the Layered Silicate Material, polymerized to a polyamide and complexed with the platelet surfaces to form a polyamide Intercalate, and a portion of the Intercalant Monomer polymerizes to a polyamide outside of the platelet interlayer spaces to form part of a matrix polymer of a nanocomposite.

"Intercalating Carrier" shall mean a carrier comprising water with or without an organic solvent used together with an Intercalant Monomer to form an Intercalating Composition capable of achieving Intercalation of the Layered Silicate Material.

"Intercalating Composition" shall mean a composition comprising an one or more Intercalant Monomers, an Intercalating Carrier for the Intercalant Monomer, and a Layered Silicate Material.

"Exfoliate" or "Exfoliated" shall mean individual platelets of an Intercalated Layered Silicate Material so that adjacent platelets of the Intercalated Layered Silicate Material can be dispersed individually throughout a carrier material, such as water, a polymer, an alcohol or glycol, or any other organic solvent, together with tactoids of 2–20 non-exfoliated platelets.

"Exfoliation" shall mean a process for forming an Exfoliate from an Intercalate.

"Nanocomposite" shall mean a thermoplastic or thermosetting polymer or polyamide in which the Intercalate and/or Exfoliate is dispersed.

"Nanomer" shall mean a Layered Silicate Material that has been intercalated with an onium ion spacing agent and/or a polyamide intercalant.

SUMMARY OF THE COMPOSITION, METHODS, AND ARTICLES

In brief, master batches or concentrate compositions containing about 6% to about 40%, preferably about 8% to about 30% by weight layered silicate material are prepared by mixing a layered silicate material, preferably ion-exchanged on its platelet surfaces with an onium ion-swelling agent, with one or more monomers capable of polymerizing during the process to form a polyamide or nylon, preferably a lactam, such as those disclosed in U.S. Pat. No. 4,739,007, hereby incorporated by reference, particularly ε-caprolactam or caprolactam. During polymerization of the polyamide monomer(s), while mixed with the layered silicate material to form a nylon-intercalated layered silicate (nylon-intercalate), polymerization of the nylon is stopped when the nylon reaches a number average molecular weight of 25,000 or less, preferably 15,000 or less, more preferably about 5,000 to about 10,000. Surprisingly, it has been found that master batch or concentrate compositions can be prepared containing 6% to about 40% by weight, preferably about 8% to about 30% by weight, nylon-intercalated layered silicate material, in a nylon matrix polymer, that can be diluted with additional matrix polymer that is the same as, or different from the nylon that has been polymerized and intercalated into the layered silicate material during the melt compounding process. Further, after diluting the nanocomposite concentrate with additional matrix polymer, the molecular weight, weight average (Mw), and/or number average (Mn), of the nylon from the nanocomposite concentrate can be increased during melt processing of the concentrate with the added matrix polymer.

Accordingly, in accordance with one aspect of the compositions, methods, and articles described herein, flowable melt master batches or concentrate compositions can be prepared that include at least 6% by weight, preferably at least 8% by weight, layered silicate material intercalated with an in-situ polymerized polyamide, by limiting the number average molecular weight (Mn) of the in-situ polymerized polyamide to 25,000 or less, preferably less than 20,000, more preferably 15,000 or less.

Another aspect of the compositions, methods, and articles described herein is to provide a nanocomposite concentrate composition, containing 6% to about 40% by weight Nanomer, that can be diluted with any matrix polymer, preferably a polyamide matrix polymer, without significant shearing, so that the resulting nanocomposite has significantly less polymer degradation.

The above and other aspects and advantages of the compositions, methods, and articles described herein will become more apparent from the following detailed description of the present invention, read together with the drawings.

DETAILED DESCRIPTION OF THE PREFERRED EMBODIMENT

The intercalate concentrate compositions described herein preferably are dispersed uniformly into a matrix polymer, e.g., a polyamide, to form a polymer/clay intercalate-containing nanocomposite and/or a polymer/exfoliate-containing nanocomposite by direct compounding of the polyamide monomer and subjecting the monomer to polymerization conditions to polymerize the polyamide monomer while mixed with the layered silicate material and, thereby, form the concentrate composition that can later be mixed with additional matrix polymer, preferably without subsequent polymer-degrading shear, to form a nanocomposite. The intercalate concentration can be directly compounded with additional pristine matrix polymer, preferably the same polyamide that results from polymerization of the polyamide monomer intercalant, to form a nanocomposite easily, while achieving a nanocomposite material with homogeneously dispersed platelets and tactoids.

In accordance with a preferred embodiment, intercalates are prepared by first contacting the layered silicate material with a monomeric onium ion-spacing agent compound. To achieve the full advantage of the present invention, the onium ion should include at least one long chain radical ($C_6+$) that may be aliphatic, straight or branched chain alkyl, or aralkyl. Exemplary of such preferred $C_6+$ onium ion molecules include primary, secondary, tertiary or quaternary ammonium ions, sulfonium ions, phosphonium ions, oxonium ions, or any ion of an element in Groups V or VI of the periodic table of elements.

In accordance with an important feature of the preferred embodiment, best results are achieved by mixing the layered silicate material with the onium ions, e.g., $C_6+$ onium ion-spacing agent, in a concentration of at least about 2% by weight, preferably at least about 5% by weight onium ion compound, more preferably at least about 10% by weight onium ion compound, and most preferably about 20% to about 50% by weight, based on the weight of onium ion compound and carrier (e.g., water, with or without an organic solvent for the onium ion compound) to achieve better sorption of the onium ion spacing agent compound between the platelets of the layered material. Regardless of the concentration of onium ion compound in the onium ion intercalating composition, the weight ratio of polyamide monomer intercalant:layered material should be at least 1.5:1, preferably at least 2:1, more preferably at least 3:1, and most preferably about 4:1 to achieve sufficient polyamide monomer intercalation between adjacent inner surfaces of adjacent platelets of the layered silicate material. The optional, preferred onium ion spacing agent compound ion-exchanged with and complexed with the aluminosilicate platelets via ion-exchange causes surprisingly easy intercalation of the polyamide monomer or oligomer intercalants.

The co-intercalation of the onium ion-spacing agent and the polyamide monomer intercalant that is polymerized during the in-situ polymerization process form a concentrate intercalate or a concentrate exfoliate, in accordance with the compositions, methods, and articles disclosed herein. Polymerization of the polyamide monomer is accomplished, preferably, by starting with a lactam monomer, such as caprolactam, and opening the lactam ring structure to begin polymerization. Ring opening can be accomplished with or without a ring-opening catalyst, such as caproic acid. The intercalate or exfoliate concentrate that can be added to a matrix oligomer or polymer, particularly by direct compounding (mixing the intercalate concentrate and/or exfoliate concentrate directly into a matrix polymer melt, preferably a polyamide matrix polymer melt that is the same as the intercalated monomer that is polymerized in-situ) of the intercalate and/or exfoliate concentrate composition with a matrix oligomer or matrix polymer that is in the same class of polymers, e.g., preferably nylon 6, nylon 11, nylon 12, or MXD6. In addition, the intercalate concentrate and/or exfoliate concentrates can be processed to form alloys or blends with other polymer(s) with or without a compatiblizer. Other polyamide-compatible matrix polymers include polyesters, polycarbonates, and their derivatives. Additional polymers, such as polyolefins, e.g., polyethylene and/or polypropylene, can be made polyamide-compatible by adding a compatibilizing agent, such as a maleic anhydride-modified polyolefin. The intercalate and/or exfoliate concentrate, added to the matrix polymer, improves a number of properties of the matrix polymer, including tensile properties, dimensional stability, ductility, gas-impermeability, and the like.

When the intercalate and/or exfoliate concentrate compositions described herein are mixed with a melt of a matrix polymer after shearing, (preferably the same matrix polymer as the intercalant polymer that results from polymerizing the intercalant polyamide monomer in-situ), the layered silicate materials are unexpectedly easily dispersed throughout the matrix polymers, without degradation by shearing of the added matrix polymer.

The layered silicate material is intercalated, preferably by first contacting the layered silicate material with an onium ion spacing agent and simultaneously or thereafter adding the melted polyamide monomer or oligomer intercalant(s) to the onium ion-intercalated layered silicate material, such as by direct compounding of the layered silicate material and the melted polyamide monomer(s) or oligomer(s) intercalant in an extruder, to intercalate the onium ion and melted polyolefin monomer(s) or oligomer(s) between adjacent layered silicate platelets and optionally separate (exfoliate) the layered silicate material into individual platelets.

Addition of the intercalate and/or exfoliate concentrate composition to a polymer melt enhances one or more properties, such as strength, temperature resistance, dimensional stability, ductility, and/or gas impermeability of the polymer; or mixing the intercalate with a carrier or solvent material maintains and/or increases viscosity and thixotropy of the carrier material. The intercalate is easily, homogeneously and uniformly dispersed throughout a matrix oligomer or matrix polymer and provides new and unexpected strength and/or gas impermeability properties to matrix polymers by virtue of the unexpectedly homogeneous dispersability of the intercalate and/or exfoliate polyamide concentrate composition throughout a matrix oligomer or polymer, particularly a polyamide matrix oligomer or polymer.

In a preferred embodiment, the interlaminar spacing between adjacent platelets of a layered silicate material, e.g., a phyllosilicate, is expanded for easier co-intercalation by a first treatment of intercalation and ion-exchange of onium ions between the aluminosilicate platelets, prior to or simultaneously with intercalation of the polyamide monomer(s) or oligomer(s). It should be understood that the polyamide monomer or oligomer intercalant(s) can be intercalated between and complexed to the internal platelet faces by other well known mechanisms, such as the dipole/dipole (direct intercalation of the polyamide monomer or oligomer) method disclosed in this Assignee's U.S. Pat. Nos. 5,880,197 and 5,877,248, hereby incorporated by reference; and by the acidification technique by substitution with hydrogen (ion-exchanging the interlayer cations with hydrogen by use of an acid or ion-exchange resin) as disclosed in the Deguchi U.S. Pat. No. 5,102,948, and in the Pinnavaia, et al. U.S. Pat. No. 5,853,886, both patents hereby incorporated by reference.

Optional Onium Ion Spacing Agent

The onium ion spacing agent is introduced into the layered silicate material galleries in the form of a solid or liquid composition (neat or aqueous, with or without an organic solvent, e.g., an aliphatic hydrocarbon, such as heptane to, if necessary, aid to dissolve the onium ion compound) having an onium ion spacing agent concentration sufficient to provide a concentration of about 5% to about 10% by weight of the layered silicate material, e.g., clay, in 90–95% water to form a clay slurry, and the onium ion compound is dissolved in the clay slurry water, preferably at a molar ratio of onium ions to exchangeable interlayer cations of at least about 0.5:1, more preferably at least about 1:1. The onium ion-intercalated clay then is separated from the water easily, since the clay is now hydrophobic, and dried in an oven to less than about 5% by weight water, preferably bone dry, before being compounded (co-intercalated) with the polyamide monomers(s) or oligomer(s), for co-intercalation of the polyamide monomer(s) or oligomer(s) and homogeneous platelet dispersion. The optional onium ion spacing agent compound can be added as a solid with the addition to the layered material onium ion compound blend of preferably at least about 20% water, more preferably at least about 30% water or more, based on the dry weight of the layered material. Preferably about 30% to about 50% water, more preferably about 30% to about 40% water, based on the dry weight of the layered material, is included in the onium ion intercalating composition, so that less water is sorbed by the intercalate, thereby necessitating less drying energy after onium ion intercalation.

The optional, but preferred onium ion spacing agent cations intercalated via ion-exchange into the interlayer spaces between adjacent layered silicate material platelets are primary, secondary, tertiary or quaternary onium ions having the following preferred structure:

wherein X=N, P, S, or O; and

Wherein $R^1$, $R^2$, $R^3$ and $R^4$ are H or organic moieties, such as linear or branched alkyl, aryl or aralkyl moieties having 1 to about 24 carbon atoms.

The more preferred $C_6$+ onium ions are preferably quaternary ammonium ions having Formula 1, as follows:

Formula 1 wherein $R^1$ is a long chain alkyl moiety ranging from $C_6$ to $C_{24}$, straight or branched chain, including mixtures of long chain moieties, i.e., $C_6$, $C_8$, $C_{10}$, $C_{12}$, $C_{14}$, $C_{16}$, $C_{18}$, $C_{20}$, $C_{22}$ and $C_{24}$, alone or in any combination; and $R^2$, $R^3$ and $R^4$ are moieties, same or different, selected from the group consisting of H, alkyl, benzyl, substituted benzyl, e.g., straight or branched chain alkyl-substituted and halogen-substituted; ethoxylated or propoxylated alkyl; ethoxylated or propoxylated benzyl, e.g., 1–10 moles of ethoxylated or 1–10 moles of propoxylation.

Additional useful multi-charged spacing/coupling agents include for example, tetra-, tri-, and di-onium species such as tetra-ammonium, tri-ammonium, and di-ammonium (primary, secondary, tertiary, and quaternary), -phosphonium, -oxonium, or -sulfonium derivatives of aliphatic, aromatic or arylaliphatic amines, phosphines, esters, alcohols and sulfides. Illustrative of such materials are di-onium compounds of the formula:

$$R^1—X^+—R—Y^+$$

where $X^+$ and $Y^+$, same or different, are ammonium, sulfonium, phosphonium, or oxonium radicals such as

—NH(CH$_3$)$_2$$^+$, —NH$_2$(CH$_3$)$^+$, —N(CH$_3$)$_3$$^+$,

—N(CH$_3$)$_2$(CH$_2$CH$_3$)$^+$, —N(CH$_3$)(CH$_2$CH$_3$)$_2$$^+$, —S(CH$_3$)$_2$$^+$,

—S(CH$_3$)$_2$$^+$, —P(CH$_3$)$_3$$^+$, —NH$_3$$^+$, and the like; R is an organic spacing, backbone radical, straight or branched, preferably having from 2 to 24, more preferably 3 to 10 carbon atoms, in a backbone organic spacing molecule covalently bonded at its ends to charged $N^+$, $P^+$, $S^+$ and/or $O^+$ cations and $R^1$ can be hydrogen, or an alkyl radical of 1 to 22 carbon atoms, linear or branched, preferably having at least 6 carbon atoms. Examples of R include substituted or unsubstituted alkylene, cycloalkenylene, cycloalkylene, arylene, alkylarylene, either unsubstituted or substituted with amino, alkylamino, dialkylamino, nitro, azido, alkenyl, alkoxy, cycloalkyl, cycloalkenyl, alkanoyl, alkylthio, alkyl, aryloxy, arylalkylamino, alkylamino, arylamino, dialkylamino, diarylamino, aryl, alkylsufinyl, aryloxy, alkylsulfinyl, alkylsulfonyl, arylthio, arylsulfinyl, alkoxycarbonyl, arylsulfonyl, or alkylsilane. Examples of $R^1$ include nonexistent; H; alkyl having 1 to 22 carbon atoms, straight chain or branched; cycloalkenyl; cycloalkyl; aryl; alkylaryl, either unsubstituted or substituted or substituted with amino, alkylamino, dialkylamino, nitro, azido, alkenyl, alkoxy, cycloalkyl, cycloalkenyl, alkanoyl, alkylthio, alkyl, aryloxy, arylalkylamino, alkylamino, arylamino, dialkylamino, diarylamino, aryl, alkylsufinyl, aryloxy, alkylsulfinyl, alkylsulfonyl, arylthio, arylsulfinyl, alkoxycarbonyl, arylsulfonyl, or alkylsilane. Illustrative of useful R groups are alkylenes, such as methylene, ethylene, octylene, nonylene, tert-butylene, neopentylene, isopropylene, sec-butylene, dodecylene and the like; alkenylenes such as 1-propenylene, 1-butenylene, 1-pentenylene, 1-hexenylene, 1-heptenylene, 1-octenylene and the like; cycloalkenylenes such as cyclohexenylene, cyclopentenylene and the like; alkanoylalkylenes such as butanoyl octadecylene, pentanoyl nonadecylene, octanoyl pentadecylene, ethanoyl undecylene, propanoyl hexadecylene and the like; alkylaminoalkylenes, such as methylamino octadecylene, ethylamino pentadecylene, butylamino nonadecylene and the like; dialkylaminoalkylene, such as dimethylamino octadecylene, methylethylamino nonadecylene and the like; arylaminoalkylenes such as phenylamino octadecylene, p-methylphenylamino nonadecylene and the like; diarylaminoalkylenes, such as diphenylamino pentadecylene, p-nitrophenyl-p'-methylphenylamino octadecylene and the like; alkylarylaminoalkylenes, such as 2-phenyl-4-methylamino pentadecylene and the like; alkylsulfinylenes, alkylsulfonylenes, alkylthio, arylthio, arylsulfinylenes, and arylsulfonylenes such as butylthio octadecylene, neopentylthio pentadecylene, methylsulfinyl nonadecylene, benzylsulfinyl pentadecylene, phenylsulfinyl octadecylene, propylthiooctadecylene, octylthio pentadecylene, nonylsulfonyl nonadecylene, octylsulfonyl hexadecylene, methylthio nonadecylene, isopropylthio octadecylene, phenylsulfonyl pentadecylene, methylsulfonyl nonadecylene, nonylthio pentadecylene, phenylthio octadecylene, ethyltio nonadecylene, benzylthio undecylene, phenethylthio pentadecylene, sec-butylthio octadecylene, naphthylthio undecylene and the like; alkoxycarbonylalkylenes such as methoxycarbonylene, ethoxycarbonylene, butoxycarbonylene and the like; cycloalkylenes such as cyclohexylene, cyclopentylene, cyclooctylene, cycloheptylene and the like; alkoxyalkylenes such as methoxymethylene, ethoxymethylene, butoxymethylene, propoxyethylene, pentoxybutylene and the like; aryloxyalkylenes and aryloxyarylenes such as phenoxyphenylene, phenoxymethylene and the like; aryloryalkylenes such as phenoxydecylene, phenoxyoctylene and the like; arylalkylenes such as benzylene, phenthylene, 8-phenyloctylene, 10-phenyldecylene and the like; alkylarylenes such as 3-decylphenylene, 4-octylphenylene, 4-nonylphenylene and the like; and polypropylene glycol and polyethylene glycol substituents such as ethylene, propylene, butylene, phenylene, benzylene, tolylene, p-styrylene, p-phenylmethylene, octylene, dodecylene, octadecylene, methoxyethylene, moieties of the formula —C$_3$H$_6$COO—, —C$_5$H$_{10}$COO—, —C$_7$H$_{10}$COO—, —C$_7$H$_{14}$COO—, —C$_9$H$_{18}$COO—, —C$_{11}$H$_{22}$COO—, —C$_{13}$H$_{26}$COO—, —C$_{15}$H$_{30}$COO—, and —C$_{17}$H$_{34}$COO— and —C=C(CH$_3$)COOCH$_2$CH$_2$—, and the like. Such tetra-, tri-, and di-ammonium, -sulfonium, -phosphonium, -oxonium; ammonium/sulfonium; ammonium/ phosphonium; ammonium/oxonium; phosphonium/ oxonium; sulfonium/oxonium; and sulfonium/phosphonium radicals are well known in the art and can be derived from the corresponding amines, phosphines, alcohols or ethers, and sulfides.

The preferred multi-charged spacing/coupling agent compounds are multi-onium ion compounds that include at least two primary, secondary, tertiary or quaternary ammonium, phosphonium, sulfonium, and/or oxonium ions having Formula 2, as follows:

Formula 2 where $X^+$ and $Y^+$, same or different, are ammonium, sulfonium, phosphonium, or oxonium radicals, and
wherein R is an alkylene, aralkylene or substituted alkylene charged atom spacing moiety, preferably ranging from $C_3$ to $C_{24}$, more preferably about $C_3$ to $C_6$ for relatively high charge density (150 milliequivalents/100 grams C.E.C. to 70 milliequivalents/100 grams C.E.C.) layered materials; and preferably from $C_6$ to $C_{12}$ for medium to low charge density (70 milliequivalents/100 grams C.E.C. to 30 milliequivalents/100 grams C.E.C.) layered materials. R can be straight or branched chain, including mixtures of such moieties, i.e., $C_4$, $C_5$, $C_6$, $C_7$, $C_8$, $C_9$, $C_{10}$, $C_{11}$, $C_{12}$, $C_{13}$, $C_{14}$, $C_{15}$, $C_{16}$, $C_{17}$, $C_{18}$, $C_{19}$, $C_{20}$, $C_{21}$, $C_{22}$, $C_{23}$ and $C_{24}$, alone or in any combination; and $R_1$, $R_2$, $R_3$ and $R_4$ are moieties, same or different, selected from the group consisting of hydrogen, alkyl, aralkyl, benzyl, substituted benzyl, e.g., straight or branched chain alkyl-substituted and halogen-substituted; ethoxylated or propoxylated alkyl; ethoxylated or propoxylated benzyl, e.g., 1–10 moles of ethoxylation or 1–10 moles of propoxylation. $Z^1$ and $Z^2$, same or different, may be non-existent, or may be any of the moieties described for $R_1$, $R_2$, $R_3$ or $R_4$. Also, one or both of $Z^1$ and $Z^2$ may include one or more positively charged atoms or onium ion molecules.

Any swellable layered silicate material that sufficiently ion-exchanges with the onium ion spacing agent at the internal platelet faces to increase the interlayer spacing between adjacent phyllosilicate platelets at least about 3 Å, preferably at least about 5 Å, can be used in the practice of this invention. Useful swellable layered materials include phyllosilicates, such as smectite clay minerals, e.g., montmorillonite, particularly sodium montmorillonite; magnesium montmorillonite and/or calcium montmorillonite; nontronite; beidellite; volkonskoite; hectorite; saponite; sauconite; sobockite; stevensite; svinfordite; vermiculite; and the like. Other useful layered materials include micaceous minerals, such as illite and mixed layered illite/smectite minerals, such as rectorite, tarosovite, ledikite and admixtures of illites with the clay minerals named above.

Preferred swellable layered silicate materials are phyllosilicates of the 2:1 type having a negative charge on the layers ranging from about 0.15 to about 0.9 charges per formula unit and a commensurate number of exchangeable metal cations in the interlayer spaces. Most preferred layered materials are smectite clay minerals such as montmorillonite, nontronite, beidellite, volkonskoite, hectorite, saponite, sauconite, sobockite, stevensite, and svinfordite.

As used herein the "interlayer spacing" refers to the distance between the internal faces of the adjacent layers as they are assembled in the layered material before any delamination (exfoliation) takes place. The preferred clay materials generally include interlayer cations such as $Na^+$, $Ca^{+2}$, $K^+$, $Mg^{+2}$, $NH_4^+$ and the like, including mixtures thereof, particularly $Na^+$.

The amount of onium ion spacing agent intercalated into the swellable layered silicate materials, in order that the intercalated layered material platelet surfaces sufficiently complex or bond via ion-exchange to the onium ion spacing agent molecules such that the layered material may be sufficiently spaced for easy intercalation of a polyamide monomer or oligomer may vary substantially between about 2%, preferably at least about 10%, and up to about 80%, based on the dry weight of the layered silicate material. In the preferred embodiments, amounts of onium ion employed, with respect to the dry weight of layered silicate material being intercalated, will preferably range from about 8 grams of onium ion spacing agent compound:100 grams of layered silicate (dry basis), preferably at least about 10 grams of onium ion spacing agent compound:100 grams of layered silicate material to about 80–90 grams onium ions spacing agent compound: 100 grams of layered silicate material. More preferred amounts are from about 20 grams of onium ion spacing agent compound:100 grams of layered silicate material to about 60 grams of onium ion spacing agent compound: 100 grams of layered silicate material (dry basis).

The polyamide monomer or oligomer intercalant may be introduced into (sorbed within) the interlayer spaces of the layered silicate material in a number of ways. In one method of intercalating the preferred polyamide monomer intercalant between adjacent platelets of the layered silicate material, the layered silicate material is slurried in water, e.g., at 5–20% by weight layered silicate material and 80–95% by weight water, and an onium ion compound is dissolved in the water in which the layered silicate material is slurried. If necessary, the onium ion compound can be dissolved first in an organic solvent, e.g., propanol. The layered material then is separated from the slurry water and dried prior to melt compounding with the polyamide monomer intercalant (or co-intercalants) for intercalation of the polyamide monomer to form the nanocomposite material in a concentrated form in a polyamide matrix oligomer or matrix polymer.

In one embodiment, a coupling agent may be reacted with the layered silicate material, preferably in an amount of about 2–4% by weight, based on the weight of the layered silicate material, before or after (or simultaneously with) the onium ion-exchange intercalation. Preferred reaction conditions (which may vary considerably) include a temperature of about 70–75° C., a pH of about 3–5, to completion of the coupling agent reaction. The coupling agent reaction can be performed in a slurry media or dry blending conditions. These lower reaction temperatures are preferred to allow the coupling agent to react at edge hydroxy groups more homogeneously over the entire layered silicate material edges. In addition, the coupling agent may be introduced to the layered silicate in-situ during the polymer melt compounding process.

In a preferred method of intercalating the polyamide monomer, the onium ion-treated layered silicate material is intimately mixed with one or more polyamide monomers at or about its melt temperature, e.g., by extrusion or pug milling, to form an intercalating composition comprising the onium ion-intercalated layered material and one or more intercalant polyamide monomers. In a preferred method of intercalating the polyamide monomer intercalant, an onium ion-exchanged layered silicate material is intimately mixed with a melt of the polyamide monomer(s), e.g., by extrusion or pug milling, to form an intercalating composition comprising an onium ion-intercalated layered silicate material and a melt of the polyamide monomer to form an intercalated concentrate composition for later dilution by the addition of matrix oligomers or matrix polymers to form the nanocomposite.

The onium ion intercalating composition preferably contains at least about 5% by weight, more preferably at least about 10% by weight onium ion compound, based on the dry weight of the coupling agent-treated layered silicate, so that the resulting onium ion-intercalated (ion-exchanged) layered silicate material has interior platelet surfaces that are sufficiently hydrophobic and sufficiently spaced for intercalation of the polyamide monomer. The amount of the coupling agent, when used, should be at least 0.1% by weight, based on the dry weight of the layered material, preferably in the range of 0.5% to 60% by weight, based on the dry weight of the layered silicate material. The onium ion carrier (preferably water, with or without an organic solvent) can be added by first solubilizing or dispersing the onium ion compound in the carrier, or a dry onium ion compound and relatively dry coupling agent-treated phyllosilicate (preferably containing at least about 4% by weight water) can be blended and the intercalating carrier added to the blend, or to the phyllosilicate prior to adding the dry onium ion. When intercalating the phyllosilicate with onium ions in slurry form (e.g., 900 pounds water, 100 pounds phyllosilicate, 100 pounds onium ion compound), the amount of water can vary substantially, e.g., from about 4% by weight, preferably from a minimum of at least about 30% by weight water, with no upper limit to the amount of water in the intercalating composition (the phyllosilicate intercalate is easily separated from the intercalating composition due to its hydrophobicity after onium ion treatment).

Alternatively, the onium ion intercalating carrier, e.g., water, with or without an organic solvent, can be added directly to the phyllosilicate prior to adding the onium ion compound, either dry or in solution. Ion-exchange of the onium ion compound molecules may be performed by exposing the coupling agent-treated layered silicate material to a dry or liquid onium ion compound in the onium ion intercalating composition containing at least about 2% by weight, preferably at least about 5% by weight onium ion compound, more preferably at least about 10% onium ion compound, based on the dry weight of the layered silicate material.

In accordance with a preferred embodiment of the present invention, the onium ion-intercalated (ion-exchanged) layered silicate material can be intercalated with one or more polyamide monomers or oligomers by direct melt compounding in an extruder and then the intercalate is dispersed into a combination of a melt-processable matrix oligomer or polymer, to form the nanocomposite. The matrix polymer is added to the concentration of polyamide monomer-intercalated layered silicate material after polymerization of the polyamide monomer to a Mn of $\leq 25,000$, preferably $<20,000$, more preferably Mn$\leq 15,000$, most preferably a Mn of 5,000 to 10,000, preferably without extrusion of the added matrix polymer, after extruding the layered material with a melt of the polyamide monomer(s) to form the nanocomposite concentrate in an extruder.

The polyamide monomer intercalants are introduced in the form of a solid or liquid composition (neat or aqueous) with or without an onium ion spacing agent having an intercalant monomer concentration of at least about 2%, preferably at least about 5% by weight intercalant monomer, more preferably at least about 50% to about 100% by weight intercalant monomer in the intercalating composition, based on the dry weight of the layered silicate material, for intercalant monomer sorption. The intercalant monomer can be added as a solid with the addition to the layered material/intercalant monomer blend of about 20% water, preferably at least about 30% water to about 5,000% water or more, based on the dry weight of layered material. Preferably about 30% to about 50% water, more preferably about 30% to about 40% water, based on the dry weight of the layered material, is included in the intercalating composition when extruding or pug milling, so that less water is sorbed by the intercalate, thereby necessitating less drying energy after intercalation. The polyamide monomer intercalants may be introduced into the spaces between every layer, nearly every layer, or at least a predominance of the layers of the layered material such that the subsequently exfoliated platelet particles are preferably, predominantly less than about 5 layers in thickness; more preferably; predominantly about 1 or 2 layers in thickness; and most preferably, predominantly single platelets.

The polyamide intercalant monomer has an affinity for the phyllosilicate so that it is sorbed between, and is maintained associated with the surfaces of the silicate platelets, in the interlayer spaces, and after exfoliation.

Sorption of the intercalant (polyamide) monomer should be sufficient to achieve expansion of adjacent platelets of the layered material (when measured dry) to an interlayer spacing of at least about 10 Å, preferably to a spacing of at least about 20 Å, more preferably a spacing of at least about 30 Å, and most preferably a spacing of about 40–80 Å.

Any swellable layered silicate material that sufficiently sorbs the intercalant monomer to increase the interlayer spacing between adjacent layered silicate platelets to at least about 10 Å, preferably to at least about 20 Å (when the layered silicate material is measured dry) may be used in the practice of this invention. Useful swellable layered materials include phyllosilicates, such as smectite clay minerals, e.g., montmorillonite, particularly sodium montmorillonite; magnesium montmorillonite and/or calcium montmorillonite; nontronite; beidellite; volkonskoite; hectorite; saponite; sauconite; sobockite; stevensite; svinfordite; vermiculite; and the like. Other useful layered silicate materials include micaceous minerals, such as illite and mixed layered illite/smectite minerals, such as rectorite; tarosovite, ledikite and admixtures of illites with the clay minerals name above.

Other layered silicate materials having little or no charge on the layers may be useful provided they can be intercalated with the polyamide intercalant monomers to expand their interlayer spacing to at least about 10 Å, preferably to at least about 20 Å. Preferred swellable layered silicate materials are phyllosilicates of the 2:1 type having a negative charge on the layers ranging from about 0.15 to about 0.9 charges per formula unit and a commensurate number of exchangeable metal cations in the interlayer spaces. Most preferred layered materials are smectite clay minerals such as montmorillonite, nontronite, beidellite, volkonskoite, hectorite, saponite, sauconite, sobockite, stevensite, and svinfordite.

As used herein the "interlayer spacing" refers to the distance between the internal faces of the adjacent silicate platelet layers as they are assembled in the layered material before any delamination (exfoliation) takes place. The interlayer spacing is measured when the layered material is "air dry", e.g., contains about 3–6% by weight water, e.g., 5% by weight water based on the dry weight of the layered material. The preferred clay materials generally include interlayer cations such as $Na^+$, $Ca^{+2}$, $K^+$, $Mg^{+2}$, $NH_4^+$ and the like, including mixtures thereof.

The amount of polyamide intercalant monomer intercalated into the swellable layered silicate materials such that the layered material may be easily exfoliated or delaminated into individual platelets, may vary substantially between about 10% and about 90%, based on the dry weight of the layered silicate material, with the remainder of the polyamide monomer polymerizing free from the layered silicate material for use as a portion of the matrix polymer. In manufacturing the nanocomposite concentrate compositions, amounts of polyamide monomer mixed with the layered silicate material, based on the dry weight of the layered silicate material polyamide, in the intercalating composition, will preferably range from about 100 grams of polyamide monomer:100 grams of layered silicate material (dry basis), to about 900 grams of polyamide monomer: 100 grams of layered silicate material. More preferred amounts are from about 235 grams of polyamide monomer: 100 grams of layered silicate material to about 565 grams of polyamide monomer: 100 grams of layered silicate material (dry basis).

EXAMPLES

Example 1

Figure 1:
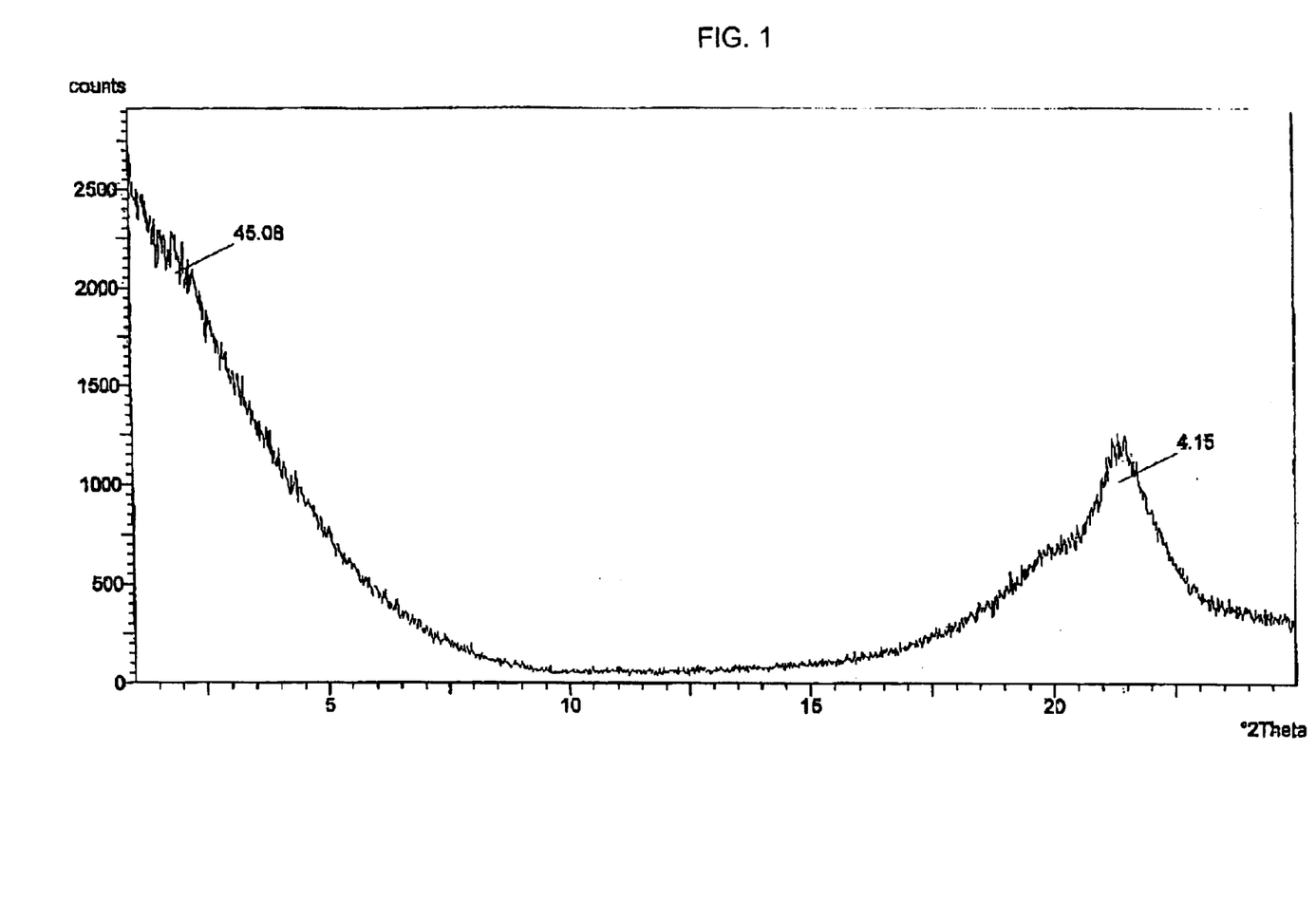
FIG. 1 is an x-ray diffraction pattern showing the basal spacing for a nylon 6 intercalate in concentrate form with 20 wt % modified layered silicate clay. The surface modification here is reactive to caprolactam to form the polymer matrix.

Formation of PA6 oligomer-terthered layered silicate concentrate: 15 wt % of Onium ion (protonated amino-dodecanoic acid) intercalated-montmorillonite was used as the nanoparticles. 380 grams of organo-montmorillonite (modified by protonated amino-dodecanoic acid chloride) with 2046 grams of caprolactam and 110 grams of amino-caproic acid to catalyze the ring opening of the caprolactam. The mixture was melted at 80–90° C. in an oven and, thereafter, was charged into a reactor having an agitator. The temperature of the reactor was increased to 265° C. The reactor agitator operated at 60 rotations per minute (rpm). The reaction time was 2 hours, and the reactor was purged with argon during the reaction time. The finished mixture was washed with hot water a few times to remove monomer, dimmer and trimer. The finished product was measured by XRD (FIG. 1) to study the layered silicate dispersion; GPC to study the degree of polymerization; and DSC to investigate the polymer crystallinity.

Example 2

Figure 2:
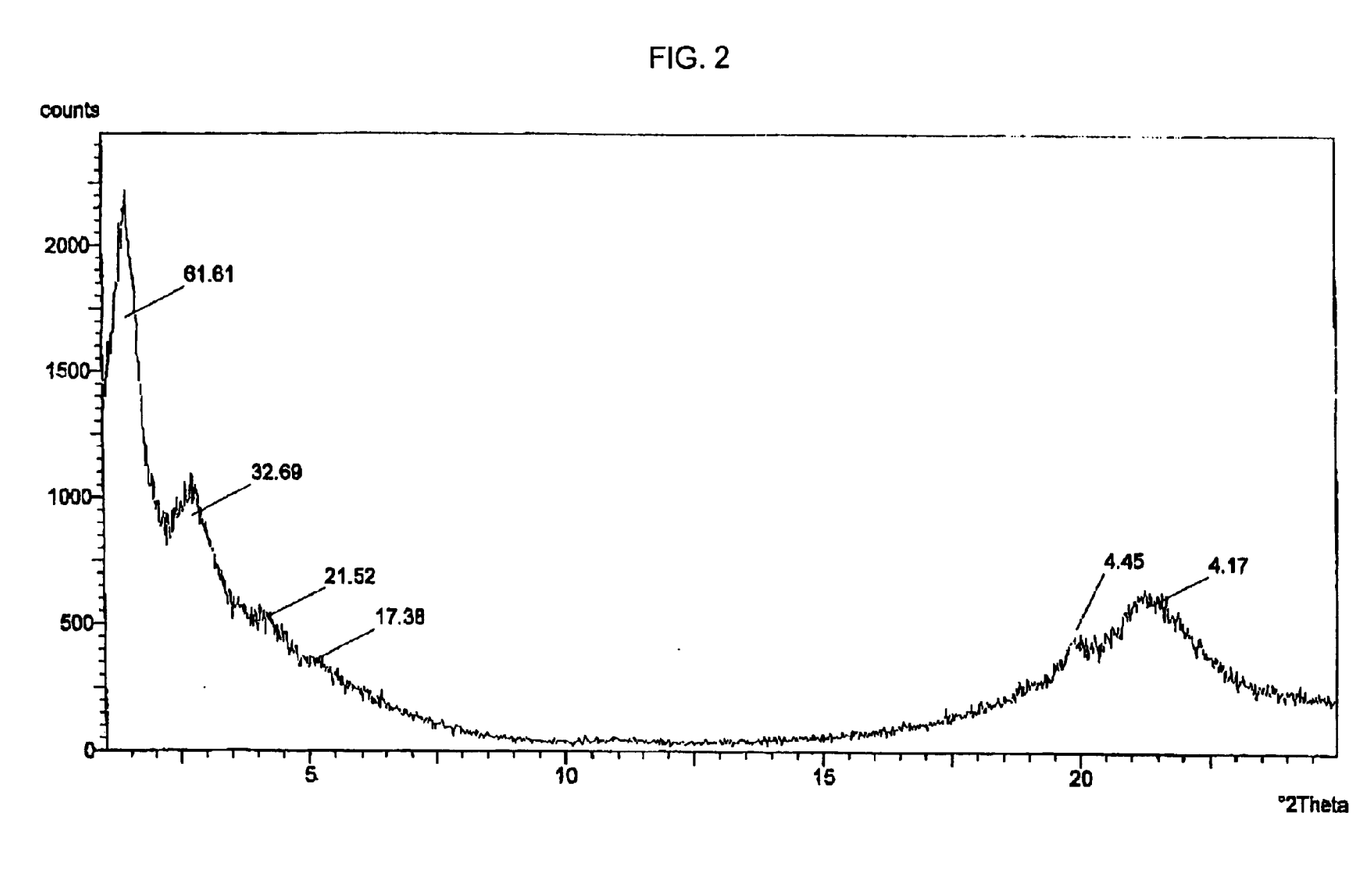
FIG. 2 is an x-ray diffraction pattern showing the basal spacing for a nylon 6 intercalate in concentrate form with 20 wt % modified layered silicate clay. The surface modification here is non-reactive to caprolactam.

Formation of PA6 oligomer-non-terthered layered silicate concentrate: 15 wt % of Onium ion (protonated octadecyl ammonium)-intercalated montmorillonite was used as the nanoparticles. 380 grams of organo-montmorillonite (modified by protonated octadecyl ammonium) with 2046 grams of caprolactam and 110 grams of amino-caproic acid. The mixture was melted at 80–90° C. in an oven and, thereafter, was charged into a reactor having an agitator. The temperature of the reactor was increased to 265° C. The reactor agitator operated at 60 rotations per minute (rpm). The reaction time was 2 hours, and the reactor was purged with argon during the reaction time. The finished mixture was washed with hot water a few times to remove monomer, dimmer and trimer. The finished product was measured by XRD (FIG. 2) to study the layered silicate dispersion; GPC to study the degree of polymerization; and DSC to investigate the polymer crystallinity.

Comparative Example 1

Formation of PA6 oligomer: 2046 grams of caprolactam and 110 grams of amino-caproic acid were mixed. The mixture was melted at 80–90° C. in an oven and, thereafter, was charged into a reactor having an agitator. The temperature of the reactor was increased to 265° C. The reactor agitator operated at 60 rotations per minute (rpm). The reaction time was two hours, and the reactor was purged with argon during the reaction time. The finished mixture was washed with hot water a few times to remove monomer, dimmer and trimer. The finished product was measured by XRD to study the layered silicate dispersion; GPC to study the degree of polymerization; and DSC to investigate the polymer crystallinity.

Comparative Example 2

Formation of PA6 oligomer Purified Montmorilonite layered silicate concentrate: 44 grams of sodium montmorillonite was mixed with 2046 grams of caprolactam and 110 grams of amino-caproic acid. The mixture was melted at 80–90° C. in an oven and, thereafter, was charged into a reactor having an agitator. The temperature of the reactor was increased to 265° C. The reactor agitator operated at 60 rotations per minute (rpm). The reaction time was 2 hours, and the reactor was purged with argon during the reaction time. The finished mixture was washed with hot water a few times to remove monomer, dimmer and trimer. The finished product was measured by XRD to study the layered silicate dispersion; GPC to study the degree of polymerization; and DSC to investigate the polymer crystallinity.

Comparative Example 3

Formation of PA6 oligomer-conventional onium ion modified (modified by di-hydrogenated tallow and di-methyl ammonium chloride) layered silicate concentrate: 380 grams of sodium montmorillonite was mixed with 2246 grams of caprolactam and 110 grams of amino-caproic acid. The mixture was melted at 80–90° C. in an oven and, thereafter, was charged into a reactor having an agitator. The temperature of the reactor was increased to 265° C. The reactor agitator operated at 60 rotations per minute (rpm). The reaction time was two hours, and the reactor was purged with argon during the reaction time. The finished mixture was washed with hot water a few times to remove monomer, dimmer and trimer. The finished product was measured by XRD to study the layered silicate dispersion; GPC to study the degree of polymerization; and DSC to investigate the polymer crystallinity.

Examples 3 and 4

Figure 3:
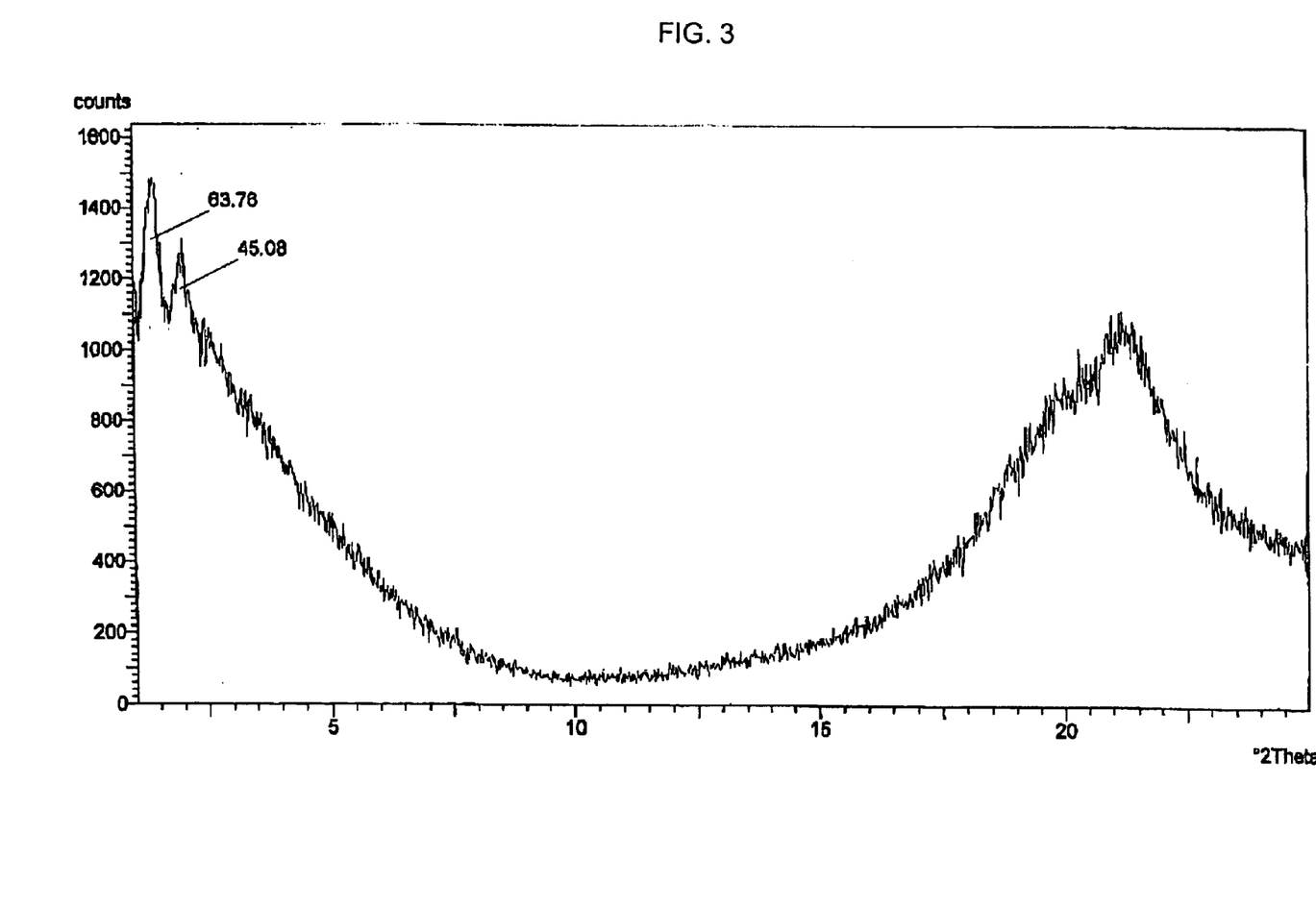
FIG. 3 is an x-ray diffraction pattern showing the basal spacing for the nylon 6 intercalate concentrate of FIG. 1, diluted with matrix polymer (MXD6) to form a nanocomposite of about 4 wt % modified layered silicate clay loading.
Figure 4:
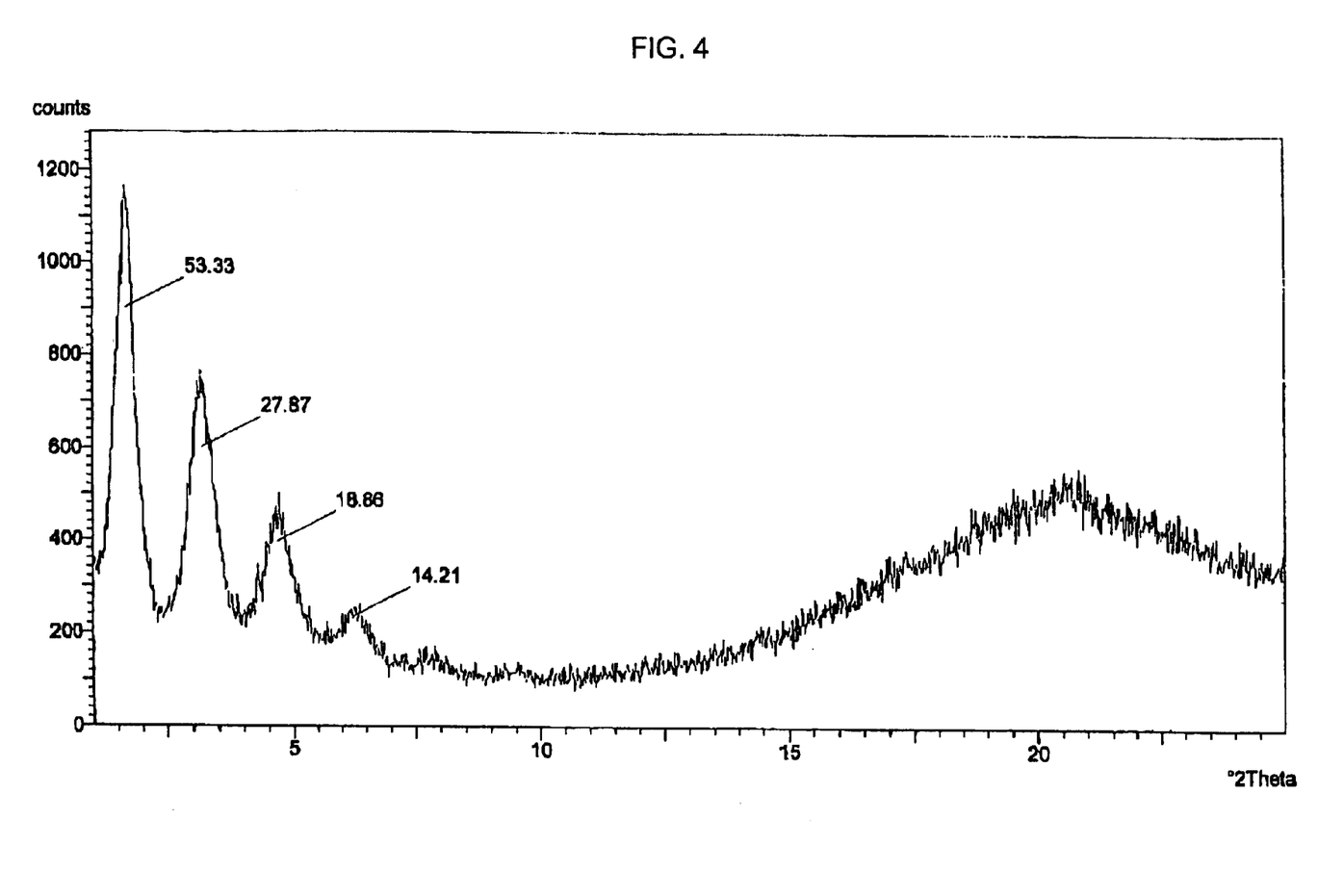
FIG. 4 is an x-ray diffraction pattern showing the basal spacing for the nylon 6 intercalate concentrate of FIG. 2, diluted with matrix polymer (MXD6) to form a nanocomposite of about 4 wt % modified layered silicate clay loading.

Preparation and Properties of Nanocomposites Containing the Concentrates Described in Examples 1 and 2:

The concentrates of Examples 1 and 2 were melt-compounded with Nylon MXD6 (MGC, grade-6121). The weight ratio of the Nylon MXD6 to the concentrate was 80 to 20 for all samples. The processing was conducted in a Leistritz 27 mm twin screw extruder at a processing temperature of 275° C. and a screw speed of 300 rpt. A monolayer film was cast from the compounded pellets formed in the extruder. Films were measured for OTR on Mocon Oxtran 2/20 and observed under an optical microscope (×200). The XRD of the finished nanocomposite films are shown in FIG. 3 and FIG. 4, respectively.

Comparative Examples 4, 5 and 6

Preparation and Properties of Nanocomposites Using the Concentrates of Comparative Examples 1, 2 and 3:

The concentrates of Comparative Examples 1, 2 and 3 were melt-compounded with Nylon MXD6 (MGC, grade-6121). The weight ratio of the Nylon MXD6 to the concentrate was 80 to 20 for all samples. The processing was conducted in a Leistritz 27 mm twin screw extruder at a processing temperature of 275° C. and screw speed of 300 rpt. A monolayer film was cast from the compounded pellets formed in the extruder. Films were measured for OTR on Mocon Oxtran 2/20 and observed under an optical microscope (×200).

| Sample/ Properties | Film Dispersion | OTR (cc · mm/m2 · day) | Interlayer basal spacing Å (001, XRD) |
|---|---|---|---|
| Example 1 | n/a | n/a | 50 |
| Example 2 | n/a | n/a | 54 |
| Example 3 | Excellent | 0.04 | 126 |
| Example 4 | Excellent | 0.05 | 54 |
| MXD6 Control | Excellent | 0.10 | n/a |
| Comparative Example 1 | n/a | n/a | n/a |

-continued

| Sample/Properties | Film Dispersion | OTR (cc · mm/m2 · day) | Interlayer basal spacing Å (001, XRD) |
|---|---|---|---|
| Comparative Example 2 | n/a | n/a | 11 |
| Comparative Example 3 | n/a | n/a | 27 |
| Comparative Example 4 | Excellent | 0.14 | n/a |
| Comparative Example 5 | Visible clay particles | 0.12 | 11 |
| Comparative Example 6 | Many gels, some clay particles | 0.16 | 27 |

Examples 5 and 6

Formation of PA6 Nanocomposites with Dilution of Concentrates of Example 1 and 2 in PA6 Matrix:

20 wt % of the oligomer concentrate of Examples 1 and 2 was mixed with 80 wt % Nylon 6 (Bayer AG's DURETHAN B29). The mixture was extruded in a Leistritz 27 mm twin screw extruder at a processing temperature of 250° C. and screw speed of 300 rpt. The finished compounds were injection molded into testing bars and cast into monolayer films. Mechanical and barrier properties were tested with results shown in the following table. The properties of un-filled B29 were listed as a reference.

Comparative Example 7

Formation of PA6 Nanocomposites Through Melt Compounding of Modified Clay in DURETHAN B29:

| Sample/Properties | Flex Modulus (MPa) | Tensile Modulus (MPa) | HDT (° C.) |
|---|---|---|---|
| B29 (Reference) | 2480 | 3013 | 53 |
| Example 5 | 3545 | 3442 | 107 |
| Example 6 | 4042 | 5157 | 95 |
| Comparative Example 7 | 3873 | 2468 | 114 |

Example 7

Formation of Nylon 66 Nanocomposites with Dilution of Concentrate of Example 1 into PA66 Resin:

20 wt % of the oligomer concentrate of Example 1 was mixed with 80 wt % nylon 66 (Du Pont's ZETEL 101). The mixture was extruded in a Leistritz 27 mm twin screw extruder at a processing temperature of 250° C. and screw speed of 300 rpt. The finished compounds were injection molded into testing bars and cast into monolayer films. Mechanical and barrier properties were tested with results shown in the following table.

Comparative Example 8

Formation of Zetyl 101 (Nylon 66) Nanocomposite Through Melt Compounding of Modified Clay into Zetyl 101;

| Sample/Properties | Flex Modulus (MPa) | Tensile Modulus (MPa) | HDT (° C.) |
|---|---|---|---|
| Zytel 101 | 3413 | 3013 | 68 |
| Example 7 | 5062 | 4701 | 93 |
| Comparative Example 8 | 4300 | 4477 | 84 |

Example 8

Formation of Nylon 6 Nanocomposite with Dilution of Concentrate of Example 1 into PA6:

20 wt % of the oligomer concentrate of Example 1 was mixed with 80 wt % nylon 6 (Honeywell CAPRON B135WP). The mixture was extruded in a Leistritz 27 mm twin screw extruder at a processing temperature of 250° C. and screw speed of 300 rpt. The finished compounds were injection molded into testing bars and cast into monolayer films. Oxygen barrier properties were tested with the results shown in the following table. The properties of un-filled B135WP were listed as a comparative reference.

Example 9

Formation of an Amorphous Nylon Nanocomposite with Dilution of the Concentrate of Example 1:

20 wt % of the oligomer concentrate of Example 1 was mixed with 80 wt % amorphous nylon (Du Pont SELAR 3426). The mixture was extruded in a Leistritz 27 mm twin screw extruder at a processing temperature of 250° C. and screw speed of 300 rpt. The finished compounds were injection molded into testing bars and cast into monolayer films. Oxygen barrier properties were tested with the results shown in the following table. The properties of un-filled Selar 3426 was listed as a comparative reference.

| Sample/Properties | Dispersion | OTR (cc · mm/m2 · day) |
|---|---|---|
| Zetyl 101 | n/a | 0.80 |
| Example 7 | excellect | 0.46 |
| B135WP (Reference) | n/a | 1.35 |
| Example 8 | excellent | 0.65 |
| Selar 3426 (Reference) | n/a | 0.50 |
| Example 9 | excellent | 0.22 |

Example 10

Formulation and Formation of Polyolefin-Nylon Alloys Using the Concentrate of Example 1:

6 kg of the concentrate of in Example 1 was mixed with 24 kg of nylon 6 (Capron 8208), 66 kg of homo-polypropylene, and 4 kg of modified polyolefin, like KRATON, as a compatibilizer. The mixture was compounded in a continuous mixer to make a PP-Nylon alloy. The final nanocomposites exhibited significantly improved mechanical properties compared with the alloy consisting of only of Nylon-8202 as the nylon phase.

Example 11

Formulation and Formation of Polyester-Nylon Alloys Using the Concentrate of Example 1.

The concentrate of Example 1 is blended with PET in a twin screw extruder at 280° C. processing temperature. The weight ratio of the concentrate : PET is in the range of 1:1 to 1:20. The finished compounds should have excellent clay dispersion and improved polymer properties, including mechanical, fire-resistance and barrier. In addition, the finished nanocomposite have about the same sample processing ability as the virgin PET, such as injection-molding, stretch-blow molding, film casting, orientated films, multilayer films, laminates, and fiber spinning.

The concentrate described in Example 1 is also blended with PBT to form a nanocomposite. The concentrate : PBT weight ration should be in the range of 1:1 to 1:20. Final composites exhibit significantly improved mechanical, fire-resistant, and barrier properties.

Example 12
Formulation and Formation of Polycarbonate (PC)-Nylon Alloys Using the Concentrate of Example 1.

The concentrate of Example 1 is blended with Polycarbonate in a twin screw extruder at 310° C. processing temperature. The ratio of the concentrate : PC is in the range of 1:1 to 1:20. The finished compounds should have excellent clay dispersion and improved polymer properties, including mechanical, fire-resistance and barrier. In addition, the finished nanocomposites should have the sample processing ability as the virgin PC.

What is claimed is:

1. A nanocomposite concentrate composition consisting of 6% to about 40% by weight of a layered silicate material intercalated with a concentrate polyamide having a number average molecular weight (Mn) of about 25,000 or less and 60% to 94% of a matrix polymer, wherein the polyamide-intercalated layered silicate material is formed by intercalating the layered silicate material with onium ions and a lactam monomer.

2. A nanocomposite concentrate composition in accordance with claim 1, wherein the Mn of the concentrate polyamide is about 15,000 or less.

3. A nanocomposite concentrate composition in accordance with claim 2, wherein the Mn of the concentrate polyamide is in the range of about 5,000 to about 10,000.

4. A nanocomposite concentrate composition in accordance with claim 1, wherein the concentrate polyamide is formed, in-situ, while in contact with the layered silicate material, by mixing the lactam with the layered silicate material, and heating the lactam above its melting point to cause ring-opening of the lactam.

5. A nanocomposite concentrate composition in accordance with claim 4, wherein the lactam is polymerized hydrolytically in the presence of water contained with the layered silicate material and the lactam.

6. A nanocomposite concentrate composition in accordance with claim 5, wherein polymerization is catalyzed with a catalyst selected from the group consisting of an acid, a base, an amino acid, an amine carboxylate, and a mixture thereof.

7. A nanocomposite concentrate composition in accordance with claim 6, wherein the ring-opening polymerization of the lactam is catalyzed with a diacid selected from the group consisting of adipic acid, isophthalic acid, and terephthalic acid and/or a diamine selected from the group consisting of hexanediamine, m-xylylenediamine, and p-xylylenediamine.

8. A nanocomposite concentrate composition in accordance with claim 4, wherein the concentrate polyamide is selected from the group consisting of nylon 6, nylon 6/6, nylon 11, nylon 12, and mixtures thereof.

9. A nanocomposite concentrate composition in accordance with claim 2, wherein the concentrate polyamide is selected from the group consisting of nylon 6, nylon 11, nylon 12, and mixtures thereof.

10. A nanocomposite concentrate composition in accordance with claim 3, wherein the concentrate polyamide is selected from the group consisting of nylon 6, nylon 6/6, nylon 11, nylon 12, and mixtures thereof.

11. A nanocomposite composition comprising 6 to 40% by weight of the composition of claim 1 mixed with 60 to 94% by weight of a polyamide-compatible matrix polymer.

12. A nanocomposite composition in accordance with claim 11, wherein the polyamide-compatible matrix polymer is a polyamide, a polyester, a polycarbonate or a polyolefin.

13. A nanocomposite composition in accordance with claim 11, wherein the concentrate polyamide is selected from nylon 6, nylon 11, and nylon 12, and the polyamide-compatible matrix polymer is nylon PA 6.

14. A nanocomposite composition in accordance with claim 12, wherein the concentrate polyamide is selected from the group consisting of nylon 6, nylon 6/6, nylon 4/6, nylon 6/9, nylon, nylon 6/10, nylon 6/12, nylon 11, nylon 12, a polyamide formed by reaction of m-xylenediamine and at least one dicarboxylic acid, and a mixture of any two or more thereof.

15. A method of manufacturing a nanocomposite composition containing a silicate material, a polyamide, and a matrix polymer comprising forming an intercalating composition comprising 6% to about 40% by weight of a layered silicate material and 60% to about 94% by weight of a lactam, and heating the intercalating composition to a temperature sufficient to open the lactam ring and polymerize the lactam to form a concentrate polyamide while in contact with the layered silicate material, and maintaining polymerization conditions for a time sufficient to polymerize the polyamide, such that the polyamide has a Mn of 25,000 or less to form a nanocomposite concentrate composition, and then combining the nanocomposite concentrate composition with the matrix polymer.

16. A method in accordance with claim 15, wherein the concentrate polyamide has a Mn of 15,000 or less.

17. A method in accordance with claim 16, wherein the concentrate polyamide has a Mn of about 5,000 to about 10,000.

18. A method in accordance with claim 15, further including exfoliating the layered silicate material while in contact with the concentrate polyamide, and mixing the concentrate composition, containing exfoliated silicate material, with a polyamide-compatible matrix polymer.

19. A method in accordance with claim 18, wherein the polyamide-compatible matrix polymer is selected from nylon 6, nylon 11, and nylon 12, and the polyamide-compatible matrix polymer is nylon PA-6.

20. A method in accordance with claim 15, wherein polyamide-compatible matrix polymer is selected from the group consisting of nylon 6, nylon6/6, nylon 4/6, nylon 6/9, nylon 6/10, nylon 6/12, nylon 11, nylon 12, a polyamide formed by reaction of m-xylenediamine and at least one dicarboxylic acid and a mixture of any two or more thereof.

* * * * *